US011374210B2

(12) United States Patent
Sugiura et al.

(10) Patent No.: US 11,374,210 B2
(45) Date of Patent: Jun. 28, 2022

(54) POSITIVE ELECTRODE MATERIAL

(71) Applicants: TOYOTA JIDOSHA KABUSHIKI KAISHA, Toyota (JP); SUMITOMO METAL MINING CO., LTD., Tokyo (JP)

(72) Inventors: Ryuta Sugiura, Toyohashi (JP); Taira Aida, Niihama (JP); Tetsutaro Hayashi, Niihama (JP); Satoshi Kanada, Niihama (JP)

(73) Assignees: TOYOTA JIDOSHA KABUSHIKI KAISHA, Toyota (JP); SUMITOMO METAL MINING CO., LTD., Tokyo (JP)

(*) Notice: Subject to any disclaimer, the term of this patent is extended or adjusted under 35 U.S.C. 154(b) by 114 days.

(21) Appl. No.: 16/410,381

(22) Filed: May 13, 2019

(65) Prior Publication Data

US 2019/0372090 A1 Dec. 5, 2019

(30) Foreign Application Priority Data

May 29, 2018 (JP) .............................. JP2018-102215

(51) Int. Cl.
| *H01M 4/13* | (2010.01) |
| *H01M 10/0525* | (2010.01) |
| *H01M 4/36* | (2006.01) |
| *H01M 4/02* | (2006.01) |

(52) U.S. Cl.
CPC ............. *H01M 4/13* (2013.01); *H01M 4/366* (2013.01); *H01M 10/0525* (2013.01); *H01M 2004/021* (2013.01); *H01M 2004/028* (2013.01)

(58) Field of Classification Search
CPC ..... H01M 4/366; H01M 10/0525; H01M 4/13
See application file for complete search history.

(56) References Cited

U.S. PATENT DOCUMENTS

| 2001/0053480 A1 | 12/2001 | Koga et al. |
| 2012/0282525 A1 | 11/2012 | Nagai et al. |
| 2015/0093580 A1* | 4/2015 | Kobayashi ............ H01M 4/131 428/403 |
| 2017/0125795 A1 | 5/2017 | Sugiura |
| 2017/0155134 A1 | 6/2017 | Sugiura |

(Continued)

FOREIGN PATENT DOCUMENTS

| JP | 2001-202960 A | 7/2001 |
| JP | 2011-119092 A | 6/2011 |

(Continued)

*Primary Examiner* — Nathanael T Zemui
(74) *Attorney, Agent, or Firm* — Oliff PLC

(57) ABSTRACT

Provided is a positive electrode material that allows reducing battery resistance. The positive electrode material disclosed herein has particles of a positive electrode active material, each having a void communicating between the surface and at least the interior; and an electronic conductor present on the surface of the particles of the positive electrode active material. The positive electrode active material has a layered rock salt structure, and has a composition represented by Formula (I) below. The electronic conductor has a composition represented by Formula (II) below, $$Li_{1+u}Ni_xMn_yCo_zM_tO_2 \quad (I)$$

$$La_{1-p}Ma_pCo_{1-q}Mb_qO_{3-\delta} \quad (II)$$

wherein the symbols in the formulas are as defined in the specification.

7 Claims, 3 Drawing Sheets

(56) References Cited

U.S. PATENT DOCUMENTS

| | | | |
|---|---|---|---|
| 2017/0179470 A1* | 6/2017 | Choi | C01G 53/006 |
| 2019/0173076 A1* | 6/2019 | Kim | H01M 4/0471 |
| 2019/0190064 A1* | 6/2019 | Fujiki | H01M 4/405 |

FOREIGN PATENT DOCUMENTS

| | | |
|---|---|---|
| JP | 2017-091664 A | 5/2017 |
| JP | 2017-103058 A | 6/2017 |

* cited by examiner

POSITIVE ELECTRODE MATERIAL

BACKGROUND OF THE INVENTION

1. Field of the Invention

The present disclosure relates to a positive electrode material. More particularly, the present disclosure relates to a material that is used in positive electrodes of secondary batteries such as lithium secondary batteries. The present application claims priority based on Japanese Patent Application No. 2018-102215 filed on May 29, 2018, the entire contents whereof are incorporated herein by reference.

2. Description of the Related Art

In recent years, secondary batteries such as lithium secondary batteries have come to being suitably used as portable power sources in personal computers, mobile terminals and the like, and as power sources for vehicle drive in for instance electric vehicles (EV), hybrid vehicles (HV) and plug-in hybrid vehicles (PHV).

Further improvements in the performance of secondary batteries such as lithium secondary batteries are being demanded as these secondary batteries have become widespread. Ordinarily, positive electrode active materials capable of storing and releasing lithium ions are used in the positive electrode of lithium secondary batteries. With a view to enhancing the performance of a lithium secondary battery, Japanese Patent Application Publication No. 2011-119092 proposes the feature of using, as a positive electrode active material of a lithium secondary battery, hollow particles having a shell portion made up of aggregates of a plurality of primary particles of a lithium-transition metal oxide as secondary particles, and a hollow portion formed in the interior of the secondary particle, with through-holes formed running through from the exterior up to the hollow portion.

SUMMARY OF THE INVENTION

Further reductions in battery resistance are demanded from secondary batteries such as lithium secondary batteries. As a result of diligent research conducted in this regard, the inventors found that there is room for improvement, in terms of reducing resistance, in cases where the secondary battery is configured using a positive electrode material in the form of positive electrode active material particles having a hollow structure such as the one illustrated in Japanese Patent Application Publication No. 2011-119092.

Therefore, it is an object of the present disclosure to provide a positive electrode material that allows reducing battery resistance.

The positive electrode material disclosed herein includes: particles of a positive electrode active material, each having a void communicating between the surface and at least the interior; and an electronic conductor present on the surface of the particles of the positive electrode active material. The positive electrode active material has a layered rock salt structure, and has a composition represented by Formula (I) below. The electronic conductor has a composition represented by Formula (II) below.

$$Li_{1+u}Ni_xMn_yCo_zM_tO_2 \quad (I)$$

In Formula (I), u, x, y, z and t satisfy $-0.1 \leq u \leq 0.5$, $0.3 \leq x \leq 0.9$, $0 \leq y \leq 0.55$, $0 \leq z \leq 0.55$, $0 \leq t \leq 0.1$ and $x+y+z+t=1$; and M is at least one element selected from the group consisting of Mg, Ca, Al, Ti, V, Cr, Si, Y, Zr, Nb, Mo, Hf, Ta and W.

$$La_{1-p}Ma_pCo_{1-q}Mb_qO_{3-\delta} \quad (II)$$

In Formula (II), p and q satisfy $0 \leq p < 1$ and $0 < q < 1$; $\delta$ is an oxygen deficit value for achieving electrical neutrality; Ma is at least one element selected from the group consisting of Ca, Sr and Ba; and Mb is at least one element selected from the group consisting of Mn and Ni.

Such a configuration allows reducing battery resistance.

In a desired implementation of the positive electrode material disclosed herein, a DBP oil absorption amount of the positive electrode material is not less than 22 mL/100 g and not more than 49 mL/100 g, more desirably not less than 38 mL/100 g and not more than 44 mL/100 g.

The battery resistance-lowering effect afforded by such a configuration is particularly high.

In a desired implementation of the positive electrode material disclosed herein, p satisfies $0 < p < 1$ in Formula (II).

The battery resistance-lowering effect afforded by such a configuration is particularly high.

In a desired implementation of the positive electrode material disclosed herein, the particles of the positive electrode active material are in the form of secondary particles formed by aggregation of primary particles, and the electronic conductor is in contact with two or more adjacent primary particles.

The battery resistance-lowering effect afforded by such a configuration is particularly high.

In a desired implementation of the positive electrode material disclosed herein, the electronic conductor is present both on an outer surface and an inner surface of the particles of the positive electrode active material.

The battery resistance-lowering effect afforded by such a configuration is particularly high.

In a desired implementation of the positive electrode material disclosed herein, an average of the inner diameter of the voids of the particles of the positive electrode active material is 3 μm or less, and a center line of the voids has one or more branches.

The battery resistance-lowering effect afforded by such a configuration is particularly high.

DESCRIPTION OF THE PREFERRED EMBODIMENTS

Figure 1:
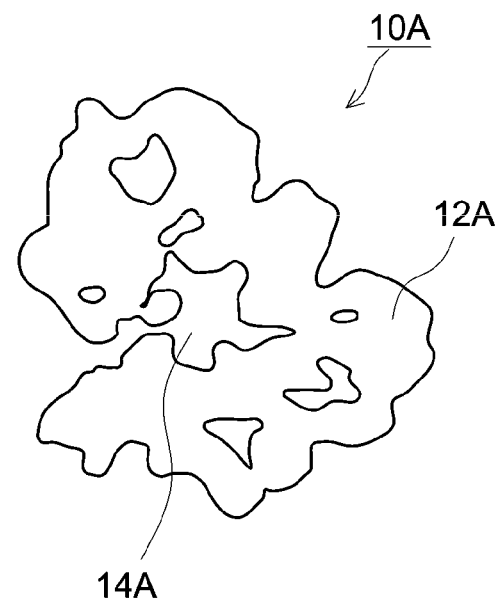
FIG. 1 is a schematic cross-sectional diagram of an example of a positive electrode material according to an embodiment of the present disclosure.

Embodiments of the present disclosure will be explained below. Any features (for example, general features of positive electrode materials and that are not characterizing features of the present disclosure) other than the matter specifically set forth in the present specification and that may be necessary for carrying out the present disclosure can be regarded as design matter for a person skilled in the art based on conventional techniques in the relevant technical field. The present disclosure can be realized on the basis of the disclosure of the present specification and common technical knowledge in the relevant technical field. In the drawings below, members and portions that elicit identical effects are denoted with identical reference numerals. The dimensional relationships (length, width, thickness and so forth) in the figures do not necessarily reflect actual dimensional relationships.

The positive electrode material according to the present embodiment contains particles of a positive electrode active material, each having a void that communicate between the surface and at least the interior, and an electronic conductor present on the surface of the particles of the positive electrode active material. The positive electrode active material has a layered rock salt structure, and has a composition represented by Formula (I) below. The electronic conductor has a composition represented by Formula (II) below.

$$Li_{1+u}Ni_xMn_yCo_zM_tO_2 \quad \text{(I)}$$

In Formula (I), u, x, y, z and t satisfy $-0.1 \leq u \leq 0.5$, $0.3 \leq x \leq 0.9$, $0 \leq y \leq 0.55$, $0 \leq z \leq 0.55$, $0 \leq t \leq 0.1$ and $x+y+z+t=1$; and M is at least one element selected from the group consisting of Mg, Ca, Al, Ti, V, Cr, Si, Y, Zr, Nb, Mo, Hf, Ta and W.

$$La_{1-p}Ma_pCo_{1-q}Mb_qO_{3-\delta} \quad \text{(II)}$$

In Formula (II), p and q satisfy $0 \leq p < 1$ and $0 < q < 1$; δ is an oxygen deficit value for achieving electrical neutrality; Ma is at least one element selected from the group consisting of Ca, Sr and Ba; and Mb is at least one element selected from the group consisting of Mn and Ni.

The positive electrode active material has a layered rock salt structure as the crystal structure of the material. The feature wherein the positive electrode active material has a layered rock salt structure can be checked by relying on a known method (for instance an X-ray diffraction (XRD) measurement).

The positive electrode active material is a lithium-transition metal composite oxide having the composition represented by Formula (I) above. In Formula (I), desirably, x, y and z are substantially identical (i.e. the composition ratios of Ni, Mn and Co are substantially identical). Specifically, x, y and z desirably satisfy $0.3 \leq x \leq 0.5$, $0.20 \leq y \leq 0.4$ and $0.20 \leq z \leq 0.4$. Further, t desirably satisfies t=0. In this case, the lithium-transition metal composite oxide has high energy density, and also superior thermal stability. As a result, the effect of the present disclosure can be exerted at a yet higher level.

The electronic conductor has a composition represented by Formula (II) above. Desirably, part of La in the electronic conductor is replaced by at least one selected from the group consisting of Ca, Sr and Ba, since in that case the battery resistance-lowering effect and durability enhancement effect are yet more pronounced. That is, p desirably satisfies $0 < p < 1$, and more desirably $0.4 \leq p \leq 0.6$, in Formula (II) above.

The composition of the positive electrode active material and of the electronic conductor can be checked by relying on a known method. Specifically, for example, the compositions of the positive electrode active material and of the electronic conductor can be checked by performing, on a cross section of the positive electrode material, energy dispersive X-ray spectroscopy and electron energy loss spectroscopy using a scanning transmission electronic microscope (STEM-EDX/EELS), and by subjecting arbitrary points to composition analysis. Alternatively, the compositions of the positive electrode active material and of the electronic conductor can be ascertained on the basis of element ratios obtained from an inductively coupled plasma (ICP) analysis of the positive electrode material.

The positive electrode active material has a void communicating between the surface and at least the interior of the material. Desirably, the void reaches the central portion of the positive electrode active material particle. The void may be a through-holes running from a point on the surface up to another point on the surface, or may be non-through-holes. The number of voids is not particularly limited, but desirably the positive electrode active material particle has a plurality of voids communicating between the surface and at least the interior of the particle (i.e. the particle is porous).

From the viewpoint of further enhancing the battery resistance-lowering effect, the average of the inner diameter of the voids is desirably 3 μm or less, more desirably 2.5 μm or less. The term inner diameter of a void denotes herein the diameter of the inscribed circle of smallest surface area that can approximate the void.

From the viewpoint of further enhancing the battery resistance-lowering effect, the center line of the void has desirably one or more branches, more desirably two or three branches. The term center line of a void denotes a line joining the center points of the inscribed circles.

Particularly desirably, the average of the inner diameter of the voids is 3 μm or less and the center line of the voids has one or more branches, since in that case the battery resistance-lowering effect is particularly high.

Also a secondary particle (so-called "a solid particle") being simple aggregates of primary particles, has a gap between the primary particles. However, the voids in the present specification do not refer to such gaps between primary particles. Therefore, the average of the inner diameter of the voids is desirably 0.5 μm or greater, more desirably 1 μm or greater.

The electronic conductor is typically scattered on the surface of the particle of the positive electrode active material. The electronic conductor may form a layer on the surface of the particle of the positive electrode active material. The electronic conductor is desirably present both on the outer surface and the inner surface (i.e. surface of a void portion) of the particles of the positive electrode active material, since in that case the battery resistance-lowering effect and durability enhancement effect are more pronounced. Desirably, the electronic conductor is in direct contact with, and immobilized on, the surface of the positive electrode active material particles.

FIG. 1 is a schematic cross-sectional diagram of an example of the positive electrode material according to the present embodiment. In FIG. 1 a positive electrode material 10A has an irregular shape. A positive electrode active material 12A included in the positive electrode material 10A has a void 14A communicating between the surface and the interior. The void 14A is a non-through-hole that reaches a central portion of a particle of the positive electrode active material 12A. An electronic conductor (not shown) is scattered on the outer surface and the inner surface of the particle of the positive electrode active material 12A. The number of the voids 14A communicating between the surface and the interior in FIG. 1 is one, but there can be other voids communicating between the surface and the interior, in a cross-sectional view from another angle.

Figure 2:
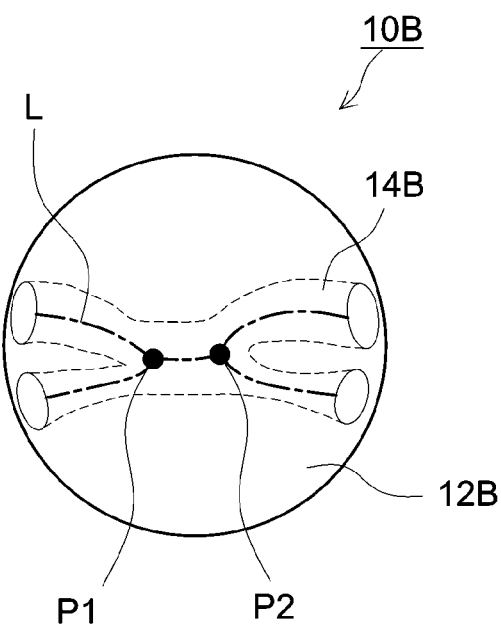
FIG. 2 is a schematic diagram of another example of a positive electrode material according to an embodiment of the present disclosure.

FIG. 2 is a schematic diagram of another example of the positive electrode material according to the present embodiment. A positive electrode material 10B is spherical. A positive electrode active material 12B included in the positive electrode material 10B has a void 14B communicating between the surface and the interior. The void 14B is a through-hole communicating between one point on the surface and another point on the surface. The through-hole that is the void 14B has two branches. Specifically, a point P1 and a point P2 on a center line L of the void 14B have respective branches. An electronic conductor (not shown) is scattered on the outer surface and the inner surface of the particle of the positive electrode active material 12B.

FIG. 1 and FIG. 2 are illustrative, and the implementation of the positive electrode material according to the present embodiment is not limited to the form depicted in the figures. For instance, the shape of the positive electrode material is not limited to being irregular or spherical, and may be some other shape (for instance plate-shaped).

The particle of the positive electrode active material may be a primary particle or a secondary particle. The particle of the positive electrode active material is desirably in the form of an secondary particle formed by aggregation of primary particles. In this case, the electronic conductor (specifically, one region made up only of the electronic conductor) is desirably in contact with two or more (in particular, three or four) adjacent primary particles. The battery resistance-lowering effect is more pronounced in this case. The number of adjacent primary particles with which the electronic conductor is in contact can be checked in accordance with a known method (for instance STEM-EDX analysis).

Herein a DBP oil absorption amount of the positive electrode material is an index correlated with the ease of penetration of an electrolyte solution of a battery. The DBP oil absorption amount of the positive electrode material according to the present embodiment is desirably not less than 22 mL/100 g and not more than 49 mL/100 g, more desirably not less than 38 mL/100 g and not more than 44 mL/100 g, since in that case the battery resistance-lowering effect and the durability enhancement effect are more pronounced. The DBP oil absorption amount can be determined in accordance with the method described in JIS K6217-4 (2008), using dibutyl phthalate and an absorptometer.

The average particle size (D50) of the positive electrode material according to the present embodiment is not particularly limited, but is for instance not less than 0.05 μm and not more than 20 μm, desirably not less than 0.5 μm and not more than 15 μm and more desirably not less than 1 μm and not more than 12 μm.

The average particle size of the positive electrode material according to the present embodiment can be determined for instance in accordance with a laser diffraction scattering method.

The method for producing the positive electrode material according to the present embodiment is not particularly limited. Suitable examples include a method that involves crystallizing a composite hydroxide containing constituent elements of the positive electrode material, other than lithium, and firing the composite hydroxide together with a lithium source. In this method, the electronic conductor can be caused to precipitate on the surface of the positive electrode active material in a case where a composite hydroxide is produced that contains for instance a La source included in the electronic conductor alone, and the composite hydroxide is fired together with a lithium source.

Where the positive electrode material according to the present embodiment is used in a battery (in particular a lithium secondary battery), battery resistance is reduced through the use of particles (hollow particles) each having a void, as the positive electrode active material, and by allowing the electronic conductor to be present on the surface of the positive electrode active material particles. This effect is more pronounced than in a combination of the effect derived from using hollow particles and the effect of allowing an electronic conductor to be present on the surface of solid particles having no void. The durability of the battery is likewise increased.

Conceivable underlying reasons for these effects include the following.

Unlike a solid particle, a hollow particle can be used for traffic of charge carriers such as Li ions not only at the outer surface but also up to the inner surface (surface of the void portion) of the particle. As a result, the reaction surface area is greater, and accordingly resistance to charge transfer is accordingly smaller. Meanwhile, electrons diffusing through the interior of a solid do not move readily on account of the complexly intricate interior shape of the solid. The hollow particle having a void at the outer surface has a smaller collection surface area, and thus exchange of electrons takes place less readily, than in the case of a solid particle, where the entirety of the outer surface can be utilized as a collecting surface. Accordingly, the hollow particle has higher electron resistance. In a case by contrast where an electronic conductor of high electron conductivity is allowed to be present on the surface of the active material, an effect of resolving the tradeoff of increased resistance, derived from making the particles hollow, is added to the effect elicited in a case where an electronic conductor is allowed to be present on solid particles; accordingly an effect can be achieved that exceeds a simple addition of the effect derived from using the hollow particle and the effect derived from the presence of the electronic conductor. A more pronounced effect is achieved in a case where the electronic conductor is in contact with a plurality of adjacent primary particles, since the effect of promoting electron transfer within the solid is brought out over a long distance.

Cracks centered on grain boundaries appear in the positive electrode active material, on account of changes in volume accompanying charging and discharge, and contact with a conductive aid on the exterior of the particles is lost. In the case of a solid particle, the primary particles of the cracked positive electrode active material are not readily isolated electrically from each other, on account of the high probability of presence of adjacent particles, while contact with the conductive aid on the periphery can be maintained readily thanks to the large outer surface area of the particles. When cracking occurs in a hollow particle, by contrast, the particles can readily become electrically isolated from each other, since the number of adjacent particles is small. Also, contact with surrounding a conductive aid is readily cut off, since the outer surface area of the particles is small. Capacity degradation is as a result prone to being significant upon repeated charging and discharge. In a case however where an electronic conductor is caused to be present on the surface of the hollow particles, conductive paths are maintained via the electronic conductor even when cracks occur at the grain boundaries of the positive electrode active material. Moreover, current density per surface area can be maintained high even when the contact area with the outer surface of the particles decreases. It becomes as a result possible to suppress effectively capacity deterioration upon repeated charging and discharge. That is, durability is improved.

The positive electrode material according to the present embodiment is used for batteries, and particularly suitably for lithium secondary batteries. A battery can be constructed, in accordance with a known method, using the positive electrode material according to the present embodiment. Therefore, an explanation follows next, with reference to accompanying drawings, on a concrete configuration example of a lithium secondary battery that utilizes the positive electrode material according to the present embodiment.

In the present specification the term "secondary battery" denotes an electric storage device in general that can be charged and discharged repeatedly, and encompasses so-called storage batteries and electric storage elements such as electrical double layer capacitors.

Figure 3:
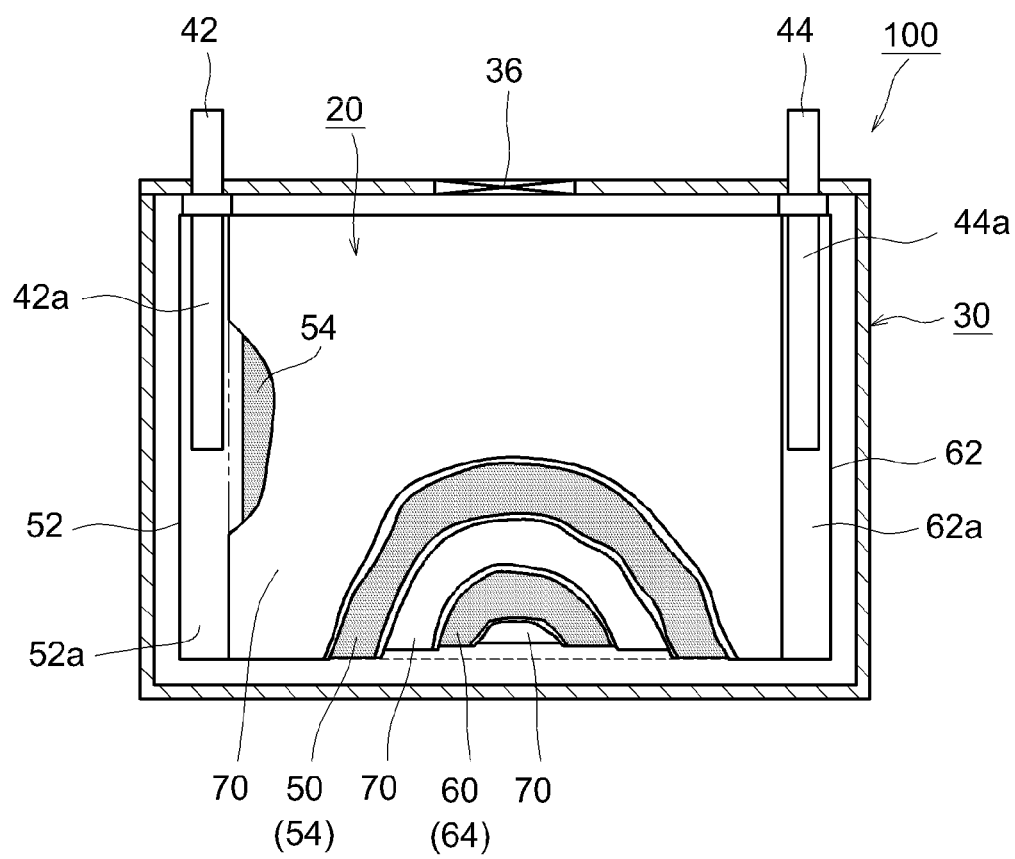
FIG. 3 is a cross-sectional diagram illustrating schematically the configuration of a lithium secondary battery constructed using a positive electrode material according to an embodiment of the present disclosure.

A lithium secondary battery 100 illustrated in FIG. 3 is a sealed-type battery constructed in such a manner that a flat wound electrode body 20 and a nonaqueous electrolyte (not shown) are accommodated in a flat square battery case (i.e. outer container) 30. The battery case 30 is provided with a positive electrode terminal 42 and a negative electrode terminal 44 for external connection, and with a thin-walled safety valve 36 configured so as to relieve internal pressure in the battery case 30 when the internal pressure rises to or above a predetermined level. The positive and negative electrode terminals 42, 44 are electrically connected to positive and negative electrode collector plates 42a, 44a, respectively. For instance, a lightweight metallic material of good thermal conductivity, such as aluminum, is used as the material of the battery case 30.

Figure 4:
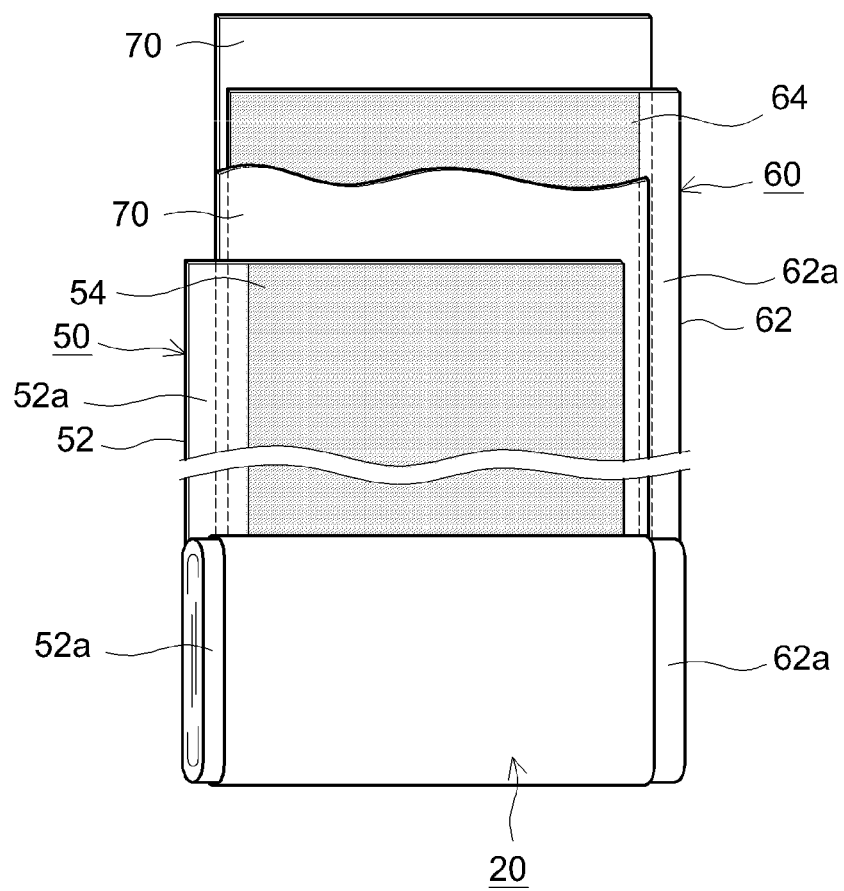
FIG. 4 is a schematic diagram illustrating the configuration of a wound electrode body of a lithium secondary battery constructed using a positive electrode material according to an embodiment of the present disclosure.

As illustrated in FIG. 3 and FIG. 4, the wound electrode body 20 results from laminating a positive electrode sheet 50 in which a positive electrode active material layer 54 is formed along the longitudinal direction, on one face or both faces (herein both faces) of an elongated positive electrode collector 52, and a negative electrode sheet 60 in which a negative electrode active material layer 64 is formed along the longitudinal direction, on one face or both faces (herein both faces) of an elongated negative electrode collector 62, with two elongated separator sheets 70 interposed in between, and by winding then the resulting laminate in the longitudinal direction. The positive electrode collector plate 42a and the negative electrode collector plate 44a are respectively joined to a positive electrode active material layer non-formation section 52a (i.e. exposed portion of the positive electrode collector 52 at which the positive electrode active material layer 54 is not formed) and a negative electrode active material layer non-formation section 62a (i.e. exposed portion of the negative electrode collector 62 at which the negative electrode active material layer 64 is not formed) that are formed so as to protrude outward from both edges of the wound electrode body 20 in the winding axis direction thereof (sheet width direction perpendicular to the longitudinal direction).

For instance, an aluminum foil can be used as the positive electrode collector 52 that makes up the positive electrode sheet 50. The positive electrode active material layer 54 contains the above-described positive electrode material according to the present embodiment, being a material containing a positive electrode active material. The positive electrode active material layer 54 can further contain for instance a conductive material and a binder. As the conductive material, there can be suitably used for instance carbon black such as acetylene black (AB) or other carbon materials (for example graphite). For instance, polyvinylidene fluoride (PVDF) can be used as the binder.

For instance, a copper foil can be used as the negative electrode collector 62 that makes up the negative electrode sheet 60. The negative electrode active material layer 64 contains a negative electrode active material. A carbon material such as graphite, hard carbon or soft carbon can be used as the negative electrode active material. The negative electrode active material layer 64 can further contain for instance a binder and a thickener. For instance, styrene butadiene rubber (SBR) can be used as the binder. For example, carboxymethyl cellulose (CMC) can be used as the thickener.

Various kinds of microporous sheets the same as or similar to those conventionally utilized in lithium secondary batteries can be used herein as the separators 70. Examples of microporous sheets include microporous resin sheets made up of a resin such as polyethylene (PE) or polypropylene (PP). The microporous resin sheet may have a single-layer structure or may have a multilayer structure of two or more layers (for instance a three-layer structure in which PP layers are laid up on both faces of a PE layer). The separators 70 may be provided with a heat-resistant layer (HRL).

An electrolyte the same as or similar to those of conventional lithium secondary batteries can be used as the nonaqueous electrolyte. Typically, a nonaqueous electrolyte can be used that contains a supporting salt in an organic solvent (nonaqueous solvent). Examples of the nonaqueous solvent include for instance aprotic solvents such as carbonates, esters and ethers. Among the foregoing there can be desirably used carbonates, for instance ethylene carbonate (EC), diethyl carbonate (DEC), dimethyl carbonate (DMC) or ethyl methyl carbonate (EMC). Alternatively, there can be desirably used a fluorine-based solvent such as a fluorinated carbonate, for instance monofluoroethylene carbonate (MFEC), difluoroethylene carbonate (DFEC), monofluoromethyl difluoromethyl carbonate (F-DMC) or trifluorodimethyl carbonate (TFDMC). Such nonaqueous solvents can be used singly or in combinations of two or more types. For instance, a lithium salt such as $LiPF_6$, $LiBF_4$ or $LiClO_4$ can be used as the supporting salt. The concentration of the supporting salt is desirably 0.7 mol/L to 1.3 mol/L.

So long as the effect of the present disclosure is not significantly impaired thereby, the above nonaqueous electrolyte can contain various additives other than the nonaqueous solvent and supporting salt described above, for instance gas generating agents, film-forming agents, dispersants and thickeners.

The lithium secondary battery 100 can be used for various applications. Desired applications include power sources for vehicle drive mounted on vehicles such as plug-in hybrid vehicles (PHV), hybrid vehicles (HV) and electric vehicles (EV). The lithium secondary battery 100 can be used in the form of a battery pack resulting from electrically connecting a plurality of lithium secondary batteries 100.

A square lithium secondary battery having a flat wound electrode body has been explained above as an example. However, the positive electrode material according to the present embodiment can also be used in other types of lithium secondary battery, in accordance with known methods. For instance, a lithium secondary battery provided with a stacked-type electrode body can be constructed using the positive electrode material according to the present embodiment. Further, a cylindrical lithium secondary battery or a laminate-type lithium secondary battery can likewise be constructed using the positive electrode material according to the present embodiment. An all-solid-state secondary battery can also be constructed using the positive electrode material according to the present embodiment.

Examples pertaining to the present disclosure will be explained in detail next, but the present disclosure is not meant to be limited to these examples.

Unless otherwise stated, in all the examples below, reagent-grade substances by Wako Pure Chemical Industries, Ltd. were used in the production of transition metal-containing composite hydroxides and positive electrode active materials. Further, the pH value of an aqueous reaction solution during a nucleation step and a particle growth step was measured using a pH controller (NPH-690D, by Nissin Rika Co., Ltd.). The supply amount of an aqueous sodium hydroxide solution was adjusted on the basis of the measured value, and the pH value of the aqueous reaction solution in each step was controlled within a range of ±0.2 with respect to the set value for the respective step.

Production of Positive Electrode Material A1

Production of Transition Metal Composite Hydroxide

Nucleation Step

Firstly, 1.4 L of water were added into a 6 L reaction vessel, and the temperature in the vessel was set to 70° C., while under stirring. The interior of the reaction vessel was purged for 30 minutes under a stream of nitrogen gas, to bring the oxygen concentration in the space inside the reaction vessel to 1 vol % or less. Next, a proper amount of a 25 mass % aqueous sodium hydroxide solution was supplied into the reaction vessel, to form an aqueous pre-reaction solution through adjustment such that the pH value was 13.1, in terms of the value at a liquid temperature of 25° C. At the same time, nickel sulfate, cobalt sulfate, manganese sulfate and lanthanum sulfate were dissolved in water, to a molar ratio of the various metal elements of Ni:Mn:Co:La=40.0:30.0:30.0:0.4, to prepare an aqueous starting material solution having a concentration of 2 mol/L.

The aqueous starting material solution was next supplied, at a flow rate of 10 mL/min, to the aqueous pre-reaction solution, to thereby form an aqueous reaction solution, and nucleation was carried out for 3 minutes through a crystallization reaction. An appropriate amount of 25 mass % aqueous sodium hydroxide solution was supplied during the above treatment, to maintain the pH value of the aqueous reaction solution within the above range.

Particle Growth Step

Once the nucleation step was over, the supply of all the aqueous solutions into the reaction vessel was discontinued temporarily. Then, 37 mass % sulfuric acid was added into the reaction vessel, to adjust the pH value inside the reaction vessel to 11.0 in terms of the value at a liquid temperature of 25° C. After confirming that the pH value had reached a predetermined value, the aqueous starting material solution was supplied to elicit growth of the nuclei generated in the nucleation step.

After 50 minutes (20.8% of the total duration of the particle growth step) had elapsed since the start of the particle growth step, the pH value of the aqueous reaction solution was adjusted to 11.8 in terms of the value at a liquid temperature of 25° C., through addition of 25 mass % aqueous sodium hydroxide solution into the reaction vessel while under continued supply of the aqueous starting material solution (changeover operation 1).

After 3 minutes (1.3% of the total duration of the particle growth step) had elapsed since the start of changeover operation 1, the pH value of the aqueous reaction solution was adjusted to 11.0 in terms of the value at a liquid temperature of 25° C., through addition of 37 mass % sulfuric acid into the reaction vessel, while under continued supply of the starting material aqueous solution (changeover operation 2).

After 187 minutes (77.9% of the total duration of the particle growth step) had elapsed since the start of changeover operation 2, supply of all aqueous solutions into the reaction vessel was discontinued, to thereby terminate the particle growth step. In the particle growth step, the 25 mass % aqueous sodium hydroxide solution was timely supplied to maintain the pH value of the aqueous reaction solution within the above range.

The concentration of product in the aqueous reaction solution at the time where the particle growth step was terminated was 86 g/L. Thereafter, the obtained product was washed with water, was filtered, and was then dried, to yield a powdery composite hydroxide.

Evaluation of Transition Metal Composite Hydroxide

With the obtained composite hydroxide as a sample, element fractions were measured using an ICP emission spectrometer (ICPE-9000 by Shimadzu Corporation). It was found that the composite hydroxide was represented by Formula:

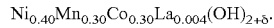

$Ni_{0.40}Mn_{0.30}Co_{0.30}La_{0.004}(OH)_{2+\delta}$.

Production of Positive Electrode Material

The obtained composite hydroxide was subjected to a 12-hour thermal treatment at 120° C. in an atmospheric (oxygen concentration: 21 vol %) air stream, as a thermal treatment step, to yield thermally treated particles. As a mixing step, the thermally treated particles were thereafter mixed with lithium carbonate, so that a value Li/(Ni+Co+Mn) was 1.10, the whole being thoroughly mixed using a shaker mixer device (TURBULA Type T2C, by Willy A. Bachofen AG (WAB)), to yield a lithium mixture.

As a firing step, the lithium mixture was next fired by being heated from room temperature up to 900° C. at a rate of temperature rise of 2.5° C./min, in an atmospheric (oxygen concentration: 21 vol %) air stream, and by holding that temperature for 4 hours. Thereafter, the mixture was cooled down to room temperature at a cooling rate of about 4° C./min. The positive electrode material thus obtained had undergone aggregation or slight sintering; and therefore, as a crushing step, the positive electrode material was crushed so that the average particle size and particle size distribution were adjusted.

Evaluation of Positive Electrode Material

With this positive electrode material as a sample, the element fraction thereof was measured using an ICP emission spectroscopy device. The positive electrode material was found to be represented by $Li_{1.1}Ni_{0.40}Mn_{0.30}Co_{0.30}La_{0.004}O_{2+\delta}$.

A cross-section of the positive electrode material was observed with a scanning electron microscope (SEM), which revealed voids communicating between the surface and the interior.

Further, the DBP oil absorption amount of the positive electrode material was measured in accordance with the method set forth in JIS K6217-4 (2008). The DBP oil absorption amount was 18 mL/100 g.

Furthermore, an XRD measurement revealed that the positive electrode material obtained by the above method had a layered rock salt-type crystal structure.

It was further found, by STEM-EDX/EESL analysis, that an electronic conductor represented by $LaNi_{0.40}Mn_{0.30}Co_{0.30}O_3$ was present on the surface of the positive electrode active material represented by $LiNi_{0.40}Mn_{0.30}Co_{0.30}O_2$.

The analysis by STEM-EDX also revealed that the number of adjacent primary particles with which the electronic conductor was in contact was 1.

Table 1 sets out the compositions of the positive electrode active material and the electronic conductor of the obtained positive electrode material, the presence or absence of a void communicating between the surface of the positive electrode active material and the interior, the DBP oil absorption amount (mL/100 g), and the number of adjacent primary particles with which the electronic conductor is in contact (adjacent primary particle count).

Production of Positive Electrode Materials A2 to A9

In the particle growth step, the structure of the composite hydroxide was controlled through modification of the timing at which changeover operation 1 and changeover operation 2 were carried out, to adjust the DBP oil absorption amount of the positive electrode material. Positive electrode materials A2 to A9 were thus obtained that had a composition and structure similar to those of the positive electrode material A1, but exhibiting different DBP oil absorption amounts. Table 1 sets out the compositions of the positive electrode active material and the electronic conductor of the obtained positive electrode materials, the presence or absence of a void communicating between the surface of the positive electrode active material and the interior, the DBP oil absorption amount (mL/100 g), and the number of adjacent primary particles with which the electronic conductor is in contact (adjacent primary particle count).

Production of Positive Electrode Materials A10 to A12

Positive electrode materials A10 to A12 were produced under conditions similar to those in the production of the positive electrode material A6, but modifying herein the addition amount ratio of the constituent element sources of the positive electrode materials. Table 1 sets out the compositions of the positive electrode active material and the electronic conductor of the produced positive electrode materials, the presence or absence of a void communicating between the surface of the positive electrode active material and the interior, the DBP oil absorption amount (mL/100 g), and the number of adjacent primary particles with which the electronic conductor is in contact (adjacent primary particle count).

Production of Positive Electrode Materials A13 and A14

Positive electrode materials A13 and A14 were produced under conditions similar to those in the production of the positive electrode material A6, using herein aluminum sulfate instead of manganese sulfate and by modifying the addition amount ratio of the constituent element sources of the positive electrode material. Table 1 sets out the compositions of the positive electrode active material and the electronic conductor of the produced positive electrode materials, the presence or absence of a void between communicating the surface of the positive electrode active material and the interior, the DBP oil absorption amount (mL/100 g), and the number of adjacent primary particles with which the electronic conductor is in contact (adjacent primary particle count).

Production of Positive Electrode Materials A15 to A17

Positive electrode materials A15 to A17 were produced under conditions similar to those in the production of the positive electrode material A6, but reducing herein the amount of lanthanum sulfate and by adding a Ca source, a Ba source and a Sr source, respectively. Table 1 sets out the compositions of the positive electrode active material and the electronic conductor of the produced positive electrode materials, the presence or absence of a void communicating between the surface of the positive electrode active material and the interior, the DBP oil absorption amount (mL/100 g), and the number of adjacent primary particles with which the electronic conductor is in contact (adjacent primary particle count).

Production of Positive Electrode Materials A18 to A20

Positive electrode materials A18 to A20 were produced under conditions similar to those in the production of the positive electrode material A6, but modifying herein the amount of lanthanum sulfate. Table 1 sets out the compositions of the positive electrode active material and the electronic conductor of the produced positive electrode materials, the presence or absence of a void communicating between the surface of the positive electrode active material and the interior, the DBP oil absorption amount (mL/100 g), and the number of adjacent primary particles with which the electronic conductor is in contact (adjacent primary particle count).

Positive Electrode Material B1

A positive electrode active material having a layered rock salt structure represented by a formula of $LiNi_{0.40}Mn_{0.30}Co_{0.30}O_2$ and not having a void in the interior was prepared in accordance with a conventional method, and specified as positive electrode material B1. Table 1 sets out the composition of the positive electrode active material, the presence or absence of a void communicating between the surface of the positive electrode active material and the interior, the DBP oil absorption amount (mL/100 g), and the number of adjacent primary particles with which the electronic conductor is in contact (adjacent primary particle count).

Positive Electrode Materials B2 and B3

Materials in which an electronic conductor represented by $LaNi_{0.40}Mn_{0.30}Co_{0.30}O_3$ was present on the surface of a positive electrode active material having a layered rock salt structure represented by a formula of $LiNi_{0.40}Mn_{0.30}Co_{0.30}O_2$ and not having a void in the interior were prepared in accordance with a conventional method, and specified as positive electrode materials B2 and B3. The DBP oil absorption amounts of the positive electrode materials B2 and B3 are different. Table 1 sets out the compositions of the positive electrode active material and the electronic conductor of these positive electrode materials, the presence or absence of a void communicating between the surface of the positive electrode active material and the interior, the DBP oil absorption amount (mL/100 g), and the number of adjacent primary particles with which the electronic conductor is in contact (adjacent primary particle count).

Positive Electrode Material B4

A positive electrode material B4 having a void communicating between the surface and the interior but not containing an electronic conductor was obtained in the same manner as positive electrode material A1, except that herein no lanthanum sulfate was added. Table 1 sets out the compositions of the obtained positive electrode active material, the presence or absence of a void communicating between the surface of the positive electrode active material and the interior, the DBP oil absorption amount (mL/100 g), and the number of adjacent primary particles with which the electronic conductor is in contact (adjacent primary particle count).

Production of Positive Electrode Materials A21 to A24

Positive electrode materials having different states of a void communicating between the surface and the interior were produced by modifying as appropriate the conditions in the production of the material. Table 2 sets out the compositions of the positive electrode active material and the electronic conductor of the produced positive electrode materials, the presence or absence of a void communicating between the surface of the positive electrode active material and the interior, the DBP oil absorption amount (mL/100 g), and the number of adjacent primary particles with which the electronic conductor is in contact (adjacent primary particle count).

Production of Lithium Secondary Batteries for Evaluation

Each positive electrode material produced above, acetylene black (AB) as a conductive material and polyvinylidene fluoride (PVDF) as a binder were mixed in N-methyl pyrrolidone (NMP) using a planetary mixer, at a mass ratio of positive electrode material:AB:PVDF=84:12:4, to thereby prepare a respective paste for forming positive electrode active material layer, having a solids concentration of 50 wt %. A respective positive electrode sheet was produced by coating the paste on both faces of an elongated aluminum foil, using a die coater, and by drying and thereafter pressing the whole.

Further, natural graphite (C) as a negative electrode active material, styrene butadiene rubber (SBR) as a binder and carboxymethyl cellulose (CMC) as a thickener were mixed in deionized water, at a mass ratio of C:SBR:CMC=98:1:1, to thereby prepare a paste for forming negative electrode active material layer. A negative electrode sheet was produced by coating the paste on both faces of an elongated copper foil, and by drying and thereafter pressing the whole.

Two separator sheets (porous polyolefin sheets) were then prepared.

Each produced positive electrode sheet, negative electrode sheet and the two prepared separator sheets were laid up on each other and were wound, to thereby produce a wound electrode body. Respective electrode terminals were attached, by welding, to the positive electrode sheet and negative electrode sheet of each produced wound electrode body, and the whole was accommodated inside a battery case having a filling port.

Next, a nonaqueous electrolyte solution was injected through the filling port of the battery case, and the filling port was sealed hermetically. As the nonaqueous electrolyte solution, there was used a solution resulting from dissolving $LiPF_6$ as a supporting salt, to a concentration of 1.0 mol/L, in a mixed solvent that contained ethylene carbonate (EC), ethyl methyl carbonate (EMC) and dimethyl carbonate (DMC) at a volume ratio of 1:1:1.

Activation and Initial Capacity Measurement

Each produced lithium secondary battery for evaluation was placed in an environment at 25° C. Activation (first charging) was carried out in accordance with a constant current-constant voltage scheme that involved charging the lithium secondary battery for evaluation at constant current up to 4.2 V, at a current value of ⅓ C, followed by charging at constant voltage up to a current value of 1/50 C, to bring about a fully charged state. Thereafter, the lithium secondary battery for evaluation was discharged at constant current down to 3.0 V, at a current value of ⅓ C. The discharge capacity at that time was measured, to determined the initial capacity.

Measurement of Battery Resistance

Each lithium secondary battery for evaluation having been activated was adjusted to a state of charge (SOC) of 60%, and thereafter was placed in a 25° C. environment. The battery was discharged for 10 seconds at a current value of 20 C, and the voltage value after 10 seconds from start of discharge was measured, to calculate battery resistance. With respect to 100 as the resistance of the lithium secondary battery for evaluation in which positive electrode material B1 was utilized, a ratio of resistance of another lithium secondary battery for evaluation was calculated. The results are given in Table 1 and Table 2.

Evaluation of Durability

Each activated lithium secondary battery for evaluation was placed in an environment at 60° C., and was then charged and discharged over 500 cycles, each cycle involving constant-current charging at 2 C up to 4.2 V and constant-current discharge at 2 C down to 3.0 V. The discharge capacity at the 500-th cycle was calculated in accordance with the same method as that of initial capacity. Then a capacity retention rate (%), as an indicator of a high-temperature cycle characteristic, was worked out as (discharge capacity at 500-th cycle of charge and discharge/initial capacity)×100. The results are given in Table 1 and Table 2.

TABLE 1

| Positive electrode material | Composition of positive electrode active material | Composition of electronic conductor | Active material void | DBP oil absorption amount (mL/100 g) | Adjacent primary particle count | Battery resistance ratio | Capacity retention rate (%) |
|---|---|---|---|---|---|---|---|
| B1 | $LiNi_{0.4}Co_{0.3}Mn_{0.3}O_2$ | None | No | 18 | No | 100 | 50 |
| B2 | $LiNi_{0.4}Co_{0.3}Mn_{0.3}O_2$ | $LaNi_{0.4}Co_{0.3}Mn_{0.3}O_3$ | No | 18 | 1 | 96 | 54 |
| B3 | $LiNi_{0.4}Co_{0.3}Mn_{0.3}O_2$ | $LaNi_{0.4}Co_{0.3}Mn_{0.3}O_3$ | No | 30 | 1 | 94 | 55 |
| B4 | $LiNi_{0.4}Co_{0.3}Mn_{0.3}O_2$ | None | Yes | 18 | No | 95 | 40 |
| A1 | $LiNi_{0.4}Co_{0.3}Mn_{0.3}O_2$ | $LaNi_{0.4}Co_{0.3}Mn_{0.3}O_3$ | Yes | 18 | 1 | 80 | 60 |
| A2 | $LiNi_{0.4}Co_{0.3}Mn_{0.3}O_2$ | $LaNi_{0.4}Co_{0.3}Mn_{0.3}O_3$ | Yes | 22 | 1 | 65 | 72 |
| A3 | $LiNi_{0.4}Co_{0.3}Mn_{0.3}O_2$ | $LaNi_{0.4}Co_{0.3}Mn_{0.3}O_3$ | Yes | 26 | 1 | 62 | 73 |
| A4 | $LiNi_{0.4}Co_{0.3}Mn_{0.3}O_2$ | $LaNi_{0.4}Co_{0.3}Mn_{0.3}O_3$ | Yes | 30 | 1 | 59 | 73 |
| A5 | $LiNi_{0.4}Co_{0.3}Mn_{0.3}O_2$ | $LaNi_{0.4}Co_{0.3}Mn_{0.3}O_3$ | Yes | 38 | 1 | 43 | 80 |
| A6 | $LiNi_{0.4}Co_{0.3}Mn_{0.3}O_2$ | $LaNi_{0.4}Co_{0.3}Mn_{0.3}O_3$ | Yes | 42 | 1 | 41 | 82 |
| A7 | $LiNi_{0.4}Co_{0.3}Mn_{0.3}O_2$ | $LaNi_{0.4}Co_{0.3}Mn_{0.3}O_3$ | Yes | 44 | 1 | 46 | 80 |
| A8 | $LiNi_{0.4}Co_{0.3}Mn_{0.3}O_2$ | $LaNi_{0.4}Co_{0.3}Mn_{0.3}O_3$ | Yes | 49 | 1 | 67 | 71 |
| A9 | $LiNi_{0.4}Co_{0.3}Mn_{0.3}O_2$ | $LaNi_{0.4}Co_{0.3}Mn_{0.3}O_3$ | Yes | 53 | 1 | 84 | 60 |
| A10 | $LiNi_{0.5}Co_{0.2}Mn_{0.2}O_2$ | $LaNi_{0.5}Co_{0.2}Mn_{0.3}O_3$ | Yes | 42 | 1 | 42 | 80 |
| A11 | $LiNi_{0.6}Co_{0.2}Mn_{0.2}O_2$ | $LaNi_{0.6}Co_{0.2}Mn_{0.2}O_3$ | Yes | 42 | 1 | 45 | 76 |
| A12 | $LiNi_{0.8}Co_{0.1}Mn_{0.1}O_2$ | $LaNi_{0.8}Co_{0.1}Mn_{0.1}O_3$ | Yes | 42 | 1 | 47 | 71 |
| A13 | $LiNi_{0.8}Co_{0.15}Al_{0.05}O_2$ | $LaNi_{0.8}Co_{0.2}O_3$ | Yes | 42 | 1 | 45 | 84 |
| A14 | $LiNi_{0.9}Co_{0.07}Al_{0.03}O_2$ | $LaNi_{0.9}Co_{0.1}O_3$ | Yes | 42 | 1 | 47 | 76 |
| A15 | $LiNi_{0.4}Co_{0.3}Mn_{0.3}O_2$ | $La_{0.5}Ca_{0.5}CoMnNiO_3$ | Yes | 42 | 1 | 35 | 85 |
| A16 | $LiNi_{0.4}Co_{0.3}Mn_{0.3}O_2$ | $La_{0.5}Ba_{0.5}CoMnNiO_3$ | Yes | 42 | 1 | 33 | 87 |
| A17 | $LiNi_{0.4}Co_{0.3}Mn_{0.3}O_2$ | $La_{0.5}Sr_{0.5}CoMnNiO_3$ | Yes | 42 | 1 | 36 | 86 |

TABLE 1-continued

| Positive electrode material | Composition of positive electrode active material | Composition of electronic conductor | Active material void | DBP oil absorption amount (mL/100 g) | Adjacent primary particle count | Battery resistance ratio | Capacity retention rate (%) |
|---|---|---|---|---|---|---|---|
| A18 | $LiNi_{0.4}Co_{0.3}Mn_{0.3}O_2$ | $LaNi_{0.4}Co_{0.3}Mn_{0.3}O_3$ | Yes | 42 | 2 | 30 | 88 |
| A19 | $LiNi_{0.4}Co_{0.3}Mn_{0.3}O_2$ | $LaNi_{0.4}Co_{0.3}Mn_{0.3}O_3$ | Yes | 42 | 3 | 26 | 91 |
| A20 | $LiNi_{0.4}Co_{0.3}Mn_{0.3}O_2$ | $LaNi_{0.4}Co_{0.3}Mn_{0.3}O_3$ | Yes | 42 | 4 | 24 | 92 |

TABLE 2

| Positive electrode material | Composition of positive electrode active material | Composition of electronic conductor | Active material voids | DBP oil absorption amount (mL/100 g) | Adjacent primary particle count | Void inner diameter (μm) | Number of branches | Battery resistance ratio | Capacity retention rate (%) |
|---|---|---|---|---|---|---|---|---|---|
| A21 | $LiNi_{0.4}Co_{0.3}Mn_{0.3}O_2$ | $LaNi_{0.4}Co_{0.3}Mn_{0.3}O_3$ | Yes | 42 | 1 | 5 | 0 | 45 | 83 |
| A6  | $LiNi_{0.4}Co_{0.3}Mn_{0.3}O_2$ | $LaNi_{0.4}Co_{0.3}Mn_{0.3}O_3$ | Yes | 42 | 1 | 3 | 1 | 41 | 82 |
| A22 | $LiNi_{0.4}Co_{0.3}Mn_{0.3}O_2$ | $LaNi_{0.4}Co_{0.3}Mn_{0.3}O_3$ | Yes | 42 | 1 | 5 | 1 | 43 | 82 |
| A23 | $LiNi_{0.4}Co_{0.3}Mn_{0.3}O_2$ | $LaNi_{0.4}Co_{0.3}Mn_{0.3}O_3$ | Yes | 42 | 1 | 2 | 1 | 39 | 82 |
| A24 | $LiNi_{0.4}Co_{0.3}Mn_{0.3}O_2$ | $LaNi_{0.4}Co_{0.3}Mn_{0.3}O_3$ | Yes | 42 | 1 | 2 | 3 | 38 | 81 |

Positive electrode material B1 is an experimental example in which a positive electrode active material has no void in the interior, and which contains no electronic conductor. Positive electrode materials B2 and B3 are experimental examples in which the positive electrode active material has no void in the interior, but contains an electronic conductor. Positive electrode material B4 is an experimental example in which a positive electrode active material has a void in the interior, but contains no electronic conductor.

A comparison between the positive electrode material B1 and the positive electrode materials B2 and B3 shows the effect derived from adding the electronic conductor to solid particles, and the effects are exhibited on reducing resistance and improving durability (increasing the capacity retention rate).

A comparison between the positive electrode material B1 and the positive electrode material B4 shows the effect derived from making the particles hollow, and the resistance-lowering effect is exhibited, but durability decreases.

By contrast, positive electrode materials A1 to A9 are experimental examples in which the positive electrode active material has a void in the interior and contains an electronic conductor. The results in positive electrode materials A1 to A9 (in particular positive electrode material A1) reveals that a significant resistance-lowering effect is achieved that exceeds a simple sum of the extents of resistance-lowering effects derived from adding an electronic conductor and from making the particle hollow. The trade-off in deterioration in durability derived from making the particle hollow is also resolved in positive electrode materials A1 to A9. It is found that the above effect is particularly high in positive electrode materials A2 to A8, where the DBP oil absorption amount is set to lie in the range of 22 mL/100 g to 49 mL/100 g, and yet more pronounced in positive electrode materials A5 to A7, where the DBP oil absorption amount is set to lie in the range of 38 mL/100 g to 44 mL/100 g.

Even with changes in the compositions of the positive electrode active material and the electronic conductor, a high resistance-lowering effect was achieved, and a durability enhancement effect was observed, in positive electrode materials A10 to A14.

Although with a modified composition of the electronic conductor through the use of La-substituting elements, a high resistance-lowering effect was achieved, and a durability enhancement effect was observed, in positive electrode materials A15 to A17.

In positive electrode materials A18 to A20, there was modified the number of adjacent primary particles with which the electronic conductor is in contact. It is found that the high resistance-lowering effect and the durability enhancement effect become more pronounced with increasing number of adjacent primary particles with which the electronic conductor is in contact.

In positive electrode materials A21 to A24, there was modified the state of the voids in the positive electrode active material (specifically, the inner diameter of the void and the number of branches of the void). It is found that the smaller the inner diameter of the void, the more pronounced is the high resistance-lowering effect that is exhibited. It is further found that a more pronounced high resistance-lowering effect is obtained with increasing number of branches of the void.

Positive electrode materials A1 to A24 are test examples of a positive electrode material within the scope of the positive electrode material according to the present embodiment. The above results reveal that the positive electrode material according to the present embodiment allows reducing battery resistance. Further, the positive electrode material according to the present embodiment allows improving battery durability.

Concrete examples of the present disclosure have been explained in detail above, but the examples are merely illustrative in nature, and are not meant to limit the scope of the claims in any way. The art set forth in the claims encompasses various alterations and modifications of the concrete examples illustrated above.

What is claimed is:

1. A positive electrode material, comprising:
   primary particles of a positive electrode active material, each having a void communicating between the surface and at least the interior,
   wherein the voids have an average inner diameter of 0.5 μm or greater; and
   an electronic conductor present on the surface of the primary particles of the positive electrode active material, wherein the positive electrode active material has a layered rock salt structure, and has a composition represented by Formula (I) below; and the electronic conductor has a composition represented by Formula (II) below, $$Li_{1+u}Ni_xMn_yCo_zM_tO_2 \quad (I)$$

in Formula (I), u, x, y, z and t satisfy $-0.1 \leq u \leq 0.5$, $0.3 \leq x \leq 0.9$, $0 \leq y \leq 0.55$, $0 \leq z \leq 0.55$, $0 \leq t \leq 0.1$ and $x+y+z+t=1$; and M is at least one element selected from the group consisting of Mg, Ca, Al, Ti, V, Cr, Si, Y, Zr, Nb, Mo, Hf, Ta and W; and $$La_{1-p}Ma_pCo_{1-q}Mb_qO_{3-\delta} \quad (II)$$

in Formula (II), p and q satisfy $0 \leq p < 1$ and $0 < q < 1$; $\delta$ is an oxygen deficit value for achieving electrical neutrality; Ma is at least one element selected from the group consisting of Ca, Sr and Ba; and Mb is at least one element selected from the group consisting of Mn and Ni.

2. The positive electrode material according to claim 1, wherein a DBP oil absorption amount is not less than 22 mL/100 g and not more than 49 mL/100 g.

3. The positive electrode material according to claim 1, wherein a DBP oil absorption amount is not less than 38 mL/100 g and not more than 44 mL/100 g.

4. The positive electrode material according to claim 1, wherein p satisfies $0<p<1$ in Formula (II).

5. The positive electrode material according to claim 1, wherein the primary particles of the positive electrode active material are in the form of secondary particles formed by aggregation of the primary particles, and the electronic conductor is in contact with two or more adjacent primary particles.

6. The positive electrode material according to claim 1, wherein the electronic conductor is present both on an outer surface and an inner surface of the primary particles of the positive electrode active material.

7. The positive electrode material according to claim 1, wherein an average of the inner diameter of the voids of the primary particles of the positive electrode active material is 3 µm or less, and a center line of the voids has one or more branches.

* * * * *